Sept. 10, 1940.　　　　H. POST　　　　2,214,347
SAFETY CONTROL MECHANISM FOR VALVES
Original Filed Aug. 17, 1937　　　3 Sheets-Sheet 1

Inventor
Hoyt Post
By J. S. Murray
Attorney

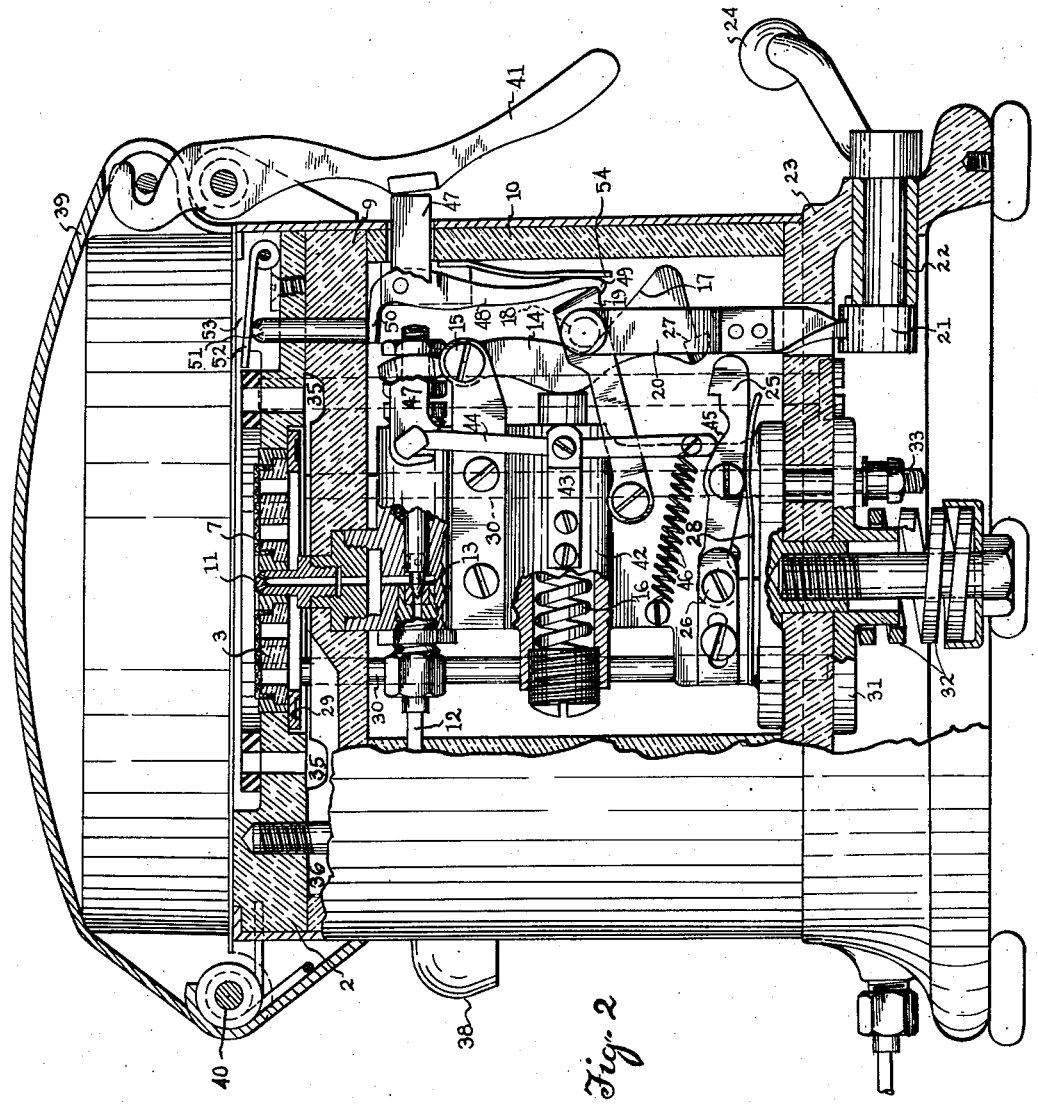

Sept. 10, 1940.  H. POST  2,214,347
SAFETY CONTROL MECHANISM FOR VALVES
Original Filed Aug. 17, 1937  3 Sheets-Sheet 3

Inventor
Hoyt Post
By
J. S. Murray
Attorney

Patented Sept. 10, 1940

2,214,347

UNITED STATES PATENT OFFICE 2,214,347

SAFETY CONTROL MECHANISM FOR VALVES

Hoyt Post, Detroit, Mich.

Application August 17, 1937, Serial No. 159,559
Renewed January 29, 1940

13 Claims. (Cl. 62—121)

This invention relates to valve control mechanisms and particularly to automatic safety mechanisms preventing fluid delivery to a machine or apparatus, under conditions that would render such delivery dangerous or wasteful.

The invention, as illustrated and described, is applied to a machine for forming cakes of $CO_2$, on which machine United States Patent #2,071,302 was issued February 16, 1937.

An object of the invention is to automatically close a valve controlling fluid delivery to a sealed chamber responsive to a premature unsealing of such chamber.

Another object is to automatically circumvent an attempt to open such a valve when the chamber is unsealed.

Further objects are to improve an apparatus having a normally sealed fluid-receiving chamber, a valve controlling fluid delivery to such chamber, and mechanism for automatically tripping such valve to closed position on completion of an operation, by providing for automatically tripping said mechanism if said chamber is prematurely unsealed, and by providing for automatically latching the trip mechanism in valve-closing position, while the chamber remains unsealed.

More specifically, the invention has for its object, the application of safety mechanisms, as above described, to a machine for solidifying $CO_2$ in a suitable mold.

These and various other objects are attained by the construction hereinafter described and illustrated in the accompany drawings, wherein:

Fig. 2 is a somewhat similar view, showing, however, said valve closed, and the cover of the machine partially unlatched.

Figure 1:
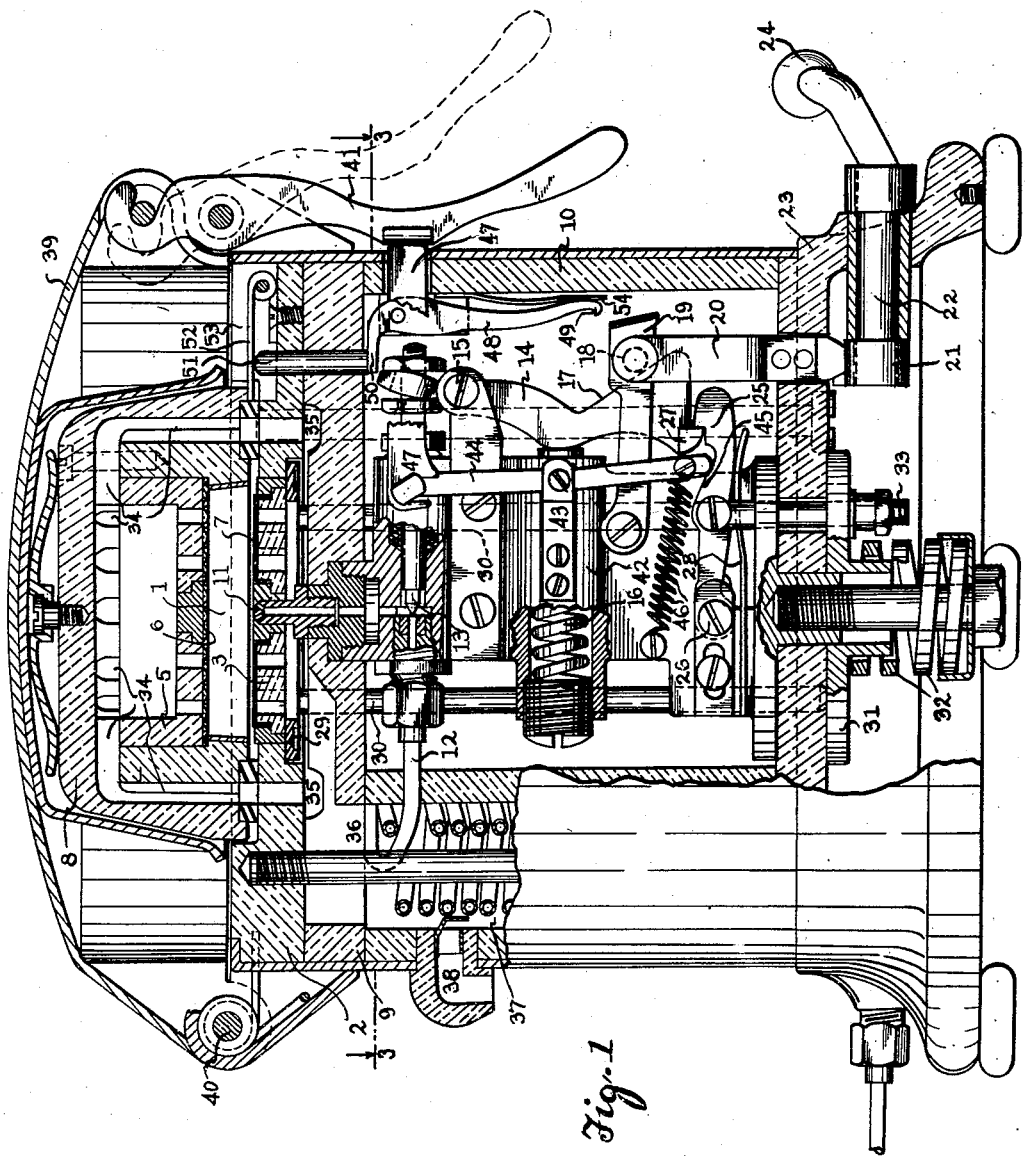
Fig. 1 is an axial, vertical, sectional view of the improved valve mechanism, as applied to a machine for forming solidified cakes of $CO_2$, the valve, which controls delivery of the fluid, being in open position.
Figure 4:
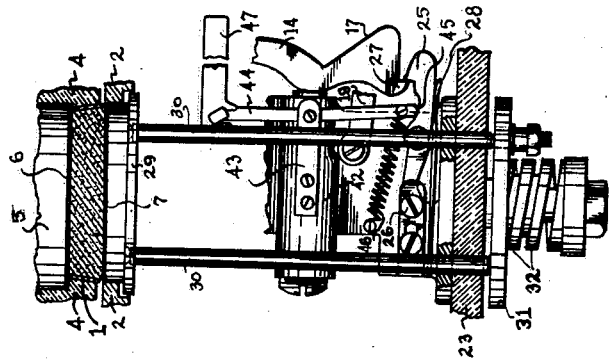
Fig. 4 is a fragmentary, vertical sectional view, showing a provision for downwardly transmitting pressure generated by a cake of $CO_2$ as it is formed in the mold chamber.
Figure 3:
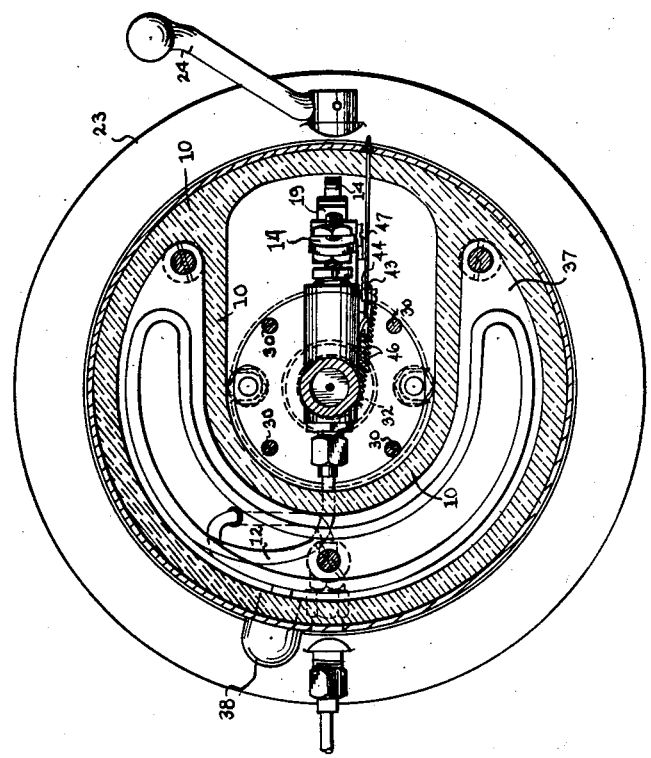
Fig. 3 is a transverse sectional view, taken substantially on the line 3—3 of Fig. 1.
Figure 5:
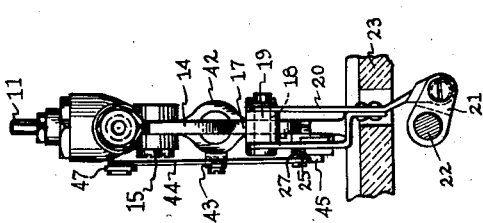
Fig. 5 is a fragmentary elevational view, partially in section, showing mechanism for latching the valve in its open position.

Describing initially such structure as is old in the patent hereinbefore identified, 1 is a mold chamber for a cake of $CO_2$, the mold comprising a plate 2 having a central circular opening, a perforated disk 3 fitting within such opening and forming the mold bottom, an annulus 4 surmounting said plate in a substantially marginal relation to said opening, a perforated member 5 fitting within the upper portion of said annulus to form the mold top, a pair of spaced circular screens 6 and 7, respectively lining the mold top and bottom, and a jacket 8, of inverted dish form, seated on the plate 2, and receiving the annulus 4 and properly positioning the latter and the parts carried thereby.

The plate 2, together with an underlying plate 9, forms the top of a casing 10, wherein is disposed mechanism controlling the delivery of liquid $CO_2$ to the mold chamber. Thus a nozzle 11, centrally carried by the plate 9 and projecting upwardly through the disk 3, receives $CO_2$ gas from a pipe 12 under control of a needle valve 13. The latter is operatively engaged by the upper end of a lever 14 pivotally mounted at a point 15, below said valve and acted upon, below its pivot by a spring 16 urging the valve to closed position. Below the level of such spring, said lever has a cam edge 17 against which a stud 18 may be downwardly actuated to rock the lever to its valve-opening position. Said stud is terminally mounted on the end portion of a pivotal arm 19, establishing an arcuate up-and-down path for the stud. Actuation of the stud is effected by a link 20 downwardly extending therefrom to an arm 21 on the inner end of a rock-shaft 22, journaled in the base 23 of said casing, such shaft being actuable, at its outer end, by a handle 24.

For holding the lever 14 in its valve-opening position, a sear latch 25, pivoted at 26, is engageable with a sear 27 integrally carried by the lower end of the lever, the latch being urged to its sear-engaging position by a spring 28. When the latch is tripped, in opposition to the spring 28, the spring 16 acts to immediately close the valve.

Progressive formation of a $CO_2$ cake in the chamber 1 imposes a considerable pressure on the walls of such chamber, and such pressure is utilized to trip the sear latch. Thus, an annular pressure plate 29 recessed in the plate 2 beneath the disk 3, has secured thereto a number of downwardly extending thrust rods 30, bearing at their lower ends on a plate 31 underlying the base 23. The last-named plate is upwardly urged and normally held against the base by a spring 32 and is linked to the sear latch 25 by a rod 33, serving to trip such latch. The spring 32 is adapted to withstand a predetermined pressure transmitted through the rods 30 by the cake under formation, and when such cake is suitably compacted, the parts 3, 30, 31, 32, and 33 yield downwardly to trip the sear latch.

Gas upwardly venting from the mold, during formation of a cake, is adapted to be carried off through vent passages 34, formed at the juncture of the annulus 4 and jacket 8, said passages having downward extensions through the plate 2 and opening into an annular duct 35 in the plate 9. Said duct communicates with an opening 36 of the plate 9, affording the gases an escape to a chamber 37, which is vented to the atmosphere at 38.

During formation of a cake, the mold is held sealed under pressure of a cover member 39, hinged to the casing at 40 and adapted to be retained in its effective position by a latch 41 having an elongated downwardly projecting handle portion. After automatic tripping of the sear latch, the operator unlatches the cover member, and removes the parts 4, 5, 6, and 8 of the mold as a unit. The cake of $CO_2$ may be removable with such unit and can be dislodged where desired.

Due to carelessness, ignorance, or inexperience, an operator may neglect to await the described automatic tripping of the sear latch and resultant closing of the valve 13, before attempting to unlatch the cover member 39. If this were permitted, the result might be disastrous, since the liquid, as admitted to the mold chamber is under a high pressure such as would violently upwardly eject the removable portion of the mold, upon release of the cover member, permitting the $CO_2$ to jet violently upward from the nozzle and produce a $CO_2$ snow storm about the machine. Such an occurrence would entail a strong possibility of injury to the operator and to any bystanders, either by the mold members or the flakes and particles of extremely cold $CO_2$. Incidently, considerable gas will be wasted through such an occurrence.

To eliminate the described hazard, the present invention provides a safeguard, as follows. Exteriorly secured to the tubular casing 42 of the spring 16 is a bracket 43, fulcruming a lever 44 projecting upwardly and downwardly from such bracket. The lower end of this lever closely approaches a cam incline 45 on the sear latch 25, and a spring 46, engaging the lower end portion of such lever, tends to move it along said incline in a direction to trip the latch. When, however, the cover latch 41 is in latching position, its handle bears against a thrust arm 47 pivoted on the upper end of the lever 44, overcoming the spring 46 and permitting the sear latch to engage the sear. If an operator prematurely releases the cover latch, by swinging it to the dash line position shown in Fig. 1, the lever 44 will be freed to respond to the spring 46, and will trip the sear latch and close the valve before the cover member has been fully unlatched.

Another error, that might be committed by a careless operator, is omission to replace the mold parts in the machine, after removal of a completed cake and before closing and latching the cover member for a subsequent operation. In such an event, the particles of $CO_2$, solidifying beneath the cover member, would be free to discharge into the vent passages, clogging the same and to some extent escaping to the atmosphere. Considerable gas would be wasted and time lost as regards use of the machine in such an event, and injury might be done to the operator or other persons by escaping particles, due to their very low temperature. Also, the described automatic trip mechanism for closing the valve at completion of an operation, would be rendered inoperative. While a manually operable emergency tripping provision has been made in the prior art and is shown in the hereinbefore mentioned Patent #2,071,302, such a provision is inadequate, since improper functioning of the machine may easily induce such excitement or fear that no use will be made of the emergency control.

To eliminate possibility of such an error, the present invention positively prevents opening of the valve, unless the mold parts are in proper position. Thus a safety latch arm 48 is pivoted upon and interiorly of the casing 10, just below the plate 9, said arm downwardly extending from its pivot and having at its lower end a latch head 49 engageable with the outer extremity of the arm 19. From the upper end of the arm 48, a relatively short arm 50 projects inwardly, adjacent to plate 9, and terminally freely supports a pin 51 vertically slidable in the plate 9. Said pin, at its upper end, bears against the inner portion of an arm 52 disposed within a chamber 53 of the plate 9 and hinged at its outer end to such plate. The inner end of the arm 52 extends below the jacket 8, when the latter is in place. When the jacket is removed, the arm 52 is raised into the seating path of the jacket by a spring 54 acting on the latch arm 48, such spring also establishing the latch arm in latching engagement with the arm 19, under such conditions. Thus it is apparent that, on removal of the jacket, the latch arm is left free to respond to the spring 54, and to consequently engage the arm 19, preventing such downward swinging of the latter as is incidental to opening of the valve 13. When the jacket is properly replaced in the machine, the safety latch arm is swung clear of the arm 19, thus avoiding interference with normal tripping of the sear latch.

The described automatic control mechanisms eliminate serious hazards in operating a machine for solidifying $CO_2$ and molding it to a desired shape and size. It is obvious, however, that these safety mechanisms are not limited in their application either to the particular machine or particular type of machine described and shown.

The invention is presented as including all such modifications and changes as come within the scope of the following claims.

What I claim is:

1. In an automatic control mechanism for fluid delivery, the combination with a normally sealed chamber, a device for unsealing such chamber, means for delivering a fluid under pressure to the chamber, a valve controlling such delivery, means yieldably urging the valve to its closed position, and a latch for holding the valve open, of means operative by the unsealing device to release the latch in advance of unsealing of the chamber.

2. An automatic control mechanism for fluid delivery, as set forth in claim 1, the means urging the valve to closed position comprising a spring energizing such means.

3. In an automatic control mechanism for fluid delivery, as set forth in claim 1, means responsive to a predetermined pressure acting in said chamber, for releasing said latch.

4. In an automatic control mechanism for fluid delivery, the combination with a normally sealed chamber, a hinged member for sealing and unsealing said chamber, a latch for securing said hinged member in sealing position, means for delivering a fluid under pressure to the chamber, a valve controlling such delivery, means urging the valve to its closed position, and a latch for holding the valve open, of means operative by unlatching of the hinged member for unlatching the valve.

5. In an automatic control mechanism for fluid delivery, the combination with a mold, having parts separable for removal of a molded member, means for securing such parts in operative assembly, means for delivering a fluid under pressure to the mold to form the molded member by solidification, a valve controlling delivery of such fluid, means yieldably urging such valve to its closed position, and a latch for holding the valve open, of means operated by a releasing actuation of said securing means for releasing said latch.

6. In an automatic control mechanism for fluid delivery, the combination with a normally sealed chamber, a device for unsealing such chamber, means for delivering a fluid under pressure to the chamber, a valve controlling such delivery, a lever for actuating the valve, a spring effective on the lever to urge the valve to closed position, mechanism effective on the lever to open the valve, and a latch coacting with such mechanism to hold the valve open, of means operative by the unsealing device to release the latch in advance of unsealing of the chamber.

7. In an automatic control mechanism for fluid delivery, the combination with a normally sealed chamber, means for delivering a fluid under pressure to the chamber, a valve controlling such delivery, means yieldably urging the valve to its closed position, and mechanism for opening the valve, of a latch effective on said mechanism to prevent an opening of the valve when the chamber is unsealed, and disengaged from said mechanism when the chamber is sealed and means for unsealing the chamber.

8. In an automatic control mechanism for fluid delivery, the combination with a mold, having parts separable for removal of a molded member, means for securing such parts in operative assembly, means for delivering a fluid under pressure to the mold to form the molded member by solidification, a valve controlling delivery of such fluid, means yieldably urging the valve to its closed position, mechanism for opening the valve, and a latch for restraining said mechanism from valve-opening operation, and means for disengaging the latch from said mechanism responsive to operative assembly of the mold.

9. In an automatic control mechanism for fluid delivery, the combination with a casing and members correlated with said casing to form a mold including a jacket adapted to seat on the casing, means for delivering a fluid to the mold for solidification therein, a valve controlling delivery of such fluid, means yieldably urging the valve to its closed position, mechanism for opening the valve, a latch member engageable with said mechanism to prevent operation thereof, and a control element for said latch member engaged by the seated jacket to release said mechanism from said latch member, when the jacket is seated.

10. In an automatic control mechanism for fluid delivery, the combination with a fluid delivery means, a valve controlling such means, and means yieldably urging the valve to closed position, of mechanism for opening said valve, and a normally sealed chamber to which the fluid delivery means makes delivery, said chamber being correlated with said mechanism to prevent operation of said mechanism when the chamber is unsealed.

11. In an automatic control for fluid delivery, the combination with a chamber, mechanism for sealing and unsealing such chamber, and means for delivering a fluid under pressure to such chamber, a valve normally cutting off delivery of such fluid, and means for opening said valve, of mechanism for automatically disabling said valve opening means responsive to unsealing of said chamber.

12. In an automatic control for fluid delivery, the combination with a chamber having a part removable to give access to said chamber, means for releasably securing said part in place, means for delivering a fluid under pressure to said chamber, a valve normally cutting off delivery of such fluid, and means for opening such valve, of mechanism for automatically disabling said valve opening means responsive to an initial releasing actuation of said securing means.

13. In an automatic control mechanism for fluid delivery, the combination with a chamber having a part removable to give interior access to the chamber, means for releasably securing such part in place, and means for delivering a fluid under pressure to such chamber, means operable by a releasing actuation of said securing means for cutting off delivery of such fluid to the chamber, such means including a normally closed valve controlling the fluid delivery means, mechanism for opening such valve, and means for disabling said mechanism responsive to removal of said part.

HOYT POST.